(12) United States Patent
Rumbaugh

(10) Patent No.: US 6,449,318 B1
(45) Date of Patent: *Sep. 10, 2002

(54) VARIABLE LOW FREQUENCY OFFSET, DIFFERENTIAL, OOK, HIGH-SPEED TWISTED PAIR COMMUNICATION

(75) Inventor: Stephen Roy Rumbaugh, Martinez, CA (US)

(73) Assignee: TeleNetwork, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/649,309

(22) Filed: Aug. 28, 2000

(51) Int. Cl.$^7$ ............................................. H04M 11/04

(52) U.S. Cl. .................................. 375/309; 340/310.01

(58) Field of Search .......................... 340/853.7, 855.4, 340/855.5, 286.02, 288, 307, 825, 825.25, 310.01, 310.02; 375/308, 309, 222, 303, 295, 257; 379/93.01; 370/480, 484

(56) References Cited

U.S. PATENT DOCUMENTS

| | | | |
|---|---|---|---|
| 4,142,178 A | 2/1979 | Whyte et al. ................ 340/310 |
| 4,350,980 A | 9/1982 | Ward ...................... 340/870.02 |
| 4,357,598 A | 11/1982 | Melvin et al. ............... 340/310 |
| 4,675,648 A | 6/1987 | Spence ........................ 342/394 |
| 4,862,157 A | 8/1989 | Noel .......................... 340/825 |
| 5,684,450 A | 11/1997 | Brown | |
| 5,774,502 A | * 6/1998 | Belcher et al. ............. 375/283 |
| 5,787,117 A | * 7/1998 | Ash ........................... 375/223 |
| 5,963,595 A | * 10/1999 | Graham et al. ............. 375/238 |
| 5,994,998 A | 11/1999 | Fisher et al. ........... 340/310.01 |
| 6,115,468 A | 9/2000 | De Nicolo | |
| 6,140,911 A | * 10/2000 | Fisher et al. ........... 340/310.01 |
| 6,275,144 B1 | 8/2001 | Rumbaugh | |

OTHER PUBLICATIONS

Search Report for PCT/US01/24018, maild Feb. 13, 2002, 1 page.

* cited by examiner

Primary Examiner—Chi Pham
Assistant Examiner—Dung X. Nguyen
(74) Attorney, Agent, or Firm—Blakely, Sokoloff, Taylor & Zafman LLP

(57) ABSTRACT

A method and system for transmitting data over twisted pair copper wires using a low frequency offset, differential voltage, on-off keying (OOK) transmission technique are described. According to one embodiment, an analog or digital signal is sent or received and converted, if necessary, into or from serial format onto or out of a twisted pair. The signal uses an OOK modulated sinusoidal offset signal with an associated differential voltage. A floating reference ground set positive or negative for the differential nature of the transmission may be required. The OOK modulated offset low frequency is being keyed to the floating ground reference that is set to a minimum signal to noise ratio (SNR) level. The SNR level may be set by adjusting the voltage separation between floating ground and the offset of the sinusoidal low frequency wave. The amplitude of the sinusoidal wave may be adjusted to provide increased transmission distance and better SNR. In addition, an encoding scheme may be used to incorporate all signaling and control information within the serial transmission. Next, the transmitted signal is input into a coupler that interfaces it to the twisted pair network. At the far end, a decoupler receives the transmission and sends the OOK sinusoidal signal out to designated amplifiers to provide voltages needed for activating an OOK detection system. The OOK detection system may use current detection that is activated every time the designated OOK signal frequency is received. Clocking may be recovered using a digital phase lock loop. Further, the OOK signal is decoded and information split off to designated leads. Afterwards, the recreated square wave transmission serial bit stream is converted to compatible signaling voltages and sent to a digital computer interface.

12 Claims, 3 Drawing Sheets

LOW FREQUENCY OFFSET, DIFFERENTIAL VOLTAGE, OOK, HIGH-SPEED COMMUNICATIONS TRANSMISSION TECHNIQUE

VARIABLE LOW FREQUENCY OFFSET, DIFFERENTIAL, OOK, HIGH-SPEED TWISTED PAIR COMMUNICATION

BACKGROUND OF THE INVENTION

1. Field of the Invention

The present invention relates to wire communications. More particularly, the present invention relates to telephone twisted pair communications.

2. Background Information

The existing methods for transmitting data communication over the twisted pair use various modulation techniques that manipulate a carrier(s) by phase, amplitude and/or frequency, and uses voltage detection. FIG. 1 illustrates a diagram of the conventional modulation techniques used in today's transmission technology.

Referring to FIG. 1, data 10 includes information that may be transmitted over the twisted pair using one of the illustrated transmission techniques. Data 10 is represented by digital signals that are transmitted in strings of binary 1s and 0s. When amplitude modulation technique 20 is used to transmit data 10, the data signal is blended into a carrier by varying the amplitude of the carrier. Specifically, the amplitude is modulated when it corresponds to a binary 0 of the data signal. On-off modulation technique 30 uses a transmitter which is turned off every time the transmitted data signal is represented by a binary 0. When frequency modulation using frequency shift keying (FSK) technique 40 is used, the data signal is blended into a carrier by modulating (shifting) the frequency of the carrier. The frequency shift occurs when a binary 0 in the data signal is encountered. Phase modulation using phase shift keying (PSK) technique 50 shifts the phase (e.g., 180°) when the data signal represented by a binary 0 is transmitted.

Some existing communication systems use multiple carrier frequency such as DSS (Digital Spread Spectrum), DMT (Digital Multi-Tone), OFDM (Orthogonal Frequency Division Multiplexing) and others. Using various modulation techniques, the twisted pair communication industry has obtained data rates of up to 52 megabits at 2000 feet. However, these signaling techniques typically require complex algorithms to recover transmitted information. The use of large and complex algorithms causes delays in communication channels and limits the bandwidth by the computational power of the signaling processing chips being used.

SUMMARY OF THE INVENTION

The object of the present invention is to provide a twisted pair communications transmission system that can transmit information at high rates with high QoS (Quality of Service). By using a differential voltage transmitting an offset low frequency sinusoidal signal within the voice spectrum, that uses an on-off keying (OOK) modulator at the rate of the data being transmitted, high bandwidth transmission speeds can be achieved. In one embodiment, the On/Off state of the low frequency sinusoidal signal can be coupled using state of the art techniques used in the digital subscriber line (DSL) field. Using various coupling techniques, the transmitted information may be used in conjunction with existing analog telephone service and plain old telephone service (POTS) being provided on the twisted pair wire by filtering the specific sinusoidal signal frequency out of the circuit.

One of the advantages of the present invention is that the signal transmitted is a transverse electromagnetic (T.E.M.) wave with an ultra-wide bandwidth. When using this transmission technique for video, voice and data communications, the invention may enable the QoS, reliability and bit error rate required for each service provided.

To provide telephone (voice) services to, from and within the home or office, the telephone must work for emergency services when power is out. The present invention may provide the ability to not only transmit and receive high-speed information, but to also provide telephone emergency service in any state that the home or office electrical service is in.

In some embodiments, information may be transmitted over twisted pairs within a building, campus, and/or over the telephone utility outside plant copper wiring. By modulating a low sinusoidal signal frequency (within the voice frequency range), offset signal, using OOK differentially, high speed transmissions (e.g., speeds of 52 megabits per second) may be realized at extended distances (e.g., 18,000 feet) over the existing twisted pair infrastructure.

Another object of the present invention is to provide cable television-type service capabilities over the twisted pair. If a TV is equipped with the present invention, or a set-to-box is connected, digital TV signals may be sent from a source over the twisted pair copper wires to the television receiver over extended distances.

Another object of the present invention is to transmit high volumes of voice transmissions (telephone conversations) over twisted pairs and interconnect this transmission to the existing public telephone network system.

Another object is to use the twisted pair transmission technology to interface into the other transmission equipment environments, such as, for example, providing trunking or concentrating communication traffic from wireless devices, or LAN (local area network) to a centralized location or peer-to-peer connections.

Another object of the invention is the ability for this technology to be channelized to provide isochronous, asynchronous, synchronous, and bi-synchronous transmissions. Video and voice could be isochronous and high-speed data transfers between computers would be asynchronous. In one embodiment, all information is sent serially.

Another object of the invention is the ability for video, voice and data to be intermixed in the twisted pair communication system. This may allow to distribute various applications (e.g., satellite, radio, cellular, microwave, PCS, telephone, audio, Internet & television communication, transmission and reception) over the twisted pair copper wiring.

In one embodiment, the present invention provides differential voltage, offset frequency, OOK as a transmission technology using a base sinusoidal wave (e.g., a base sinusoidal waive between 400 to 26,000 hertz). By adjusting the base sinusoidal wave to the best power spectrum, better signal to noise ratio can be achieved. This sinusoidal wave is OOK to the ON position when a binary 1 (one) is sent from a digital data source and turned to the OFF position when a 0 (zero) is present, however, this configuration may be inverted. Using conventional encoding and decoding schemes known in the industry, all control and timing information may be transmitted within the serial bit stream provided in the transmission technique. In one embodiment, the information/data from a digital source (e.g., PC, computer, audio system, VCR, etc.) may be transmitted into a buffer and then sent to an OOK modulator. The modulator controls the ON and OFF states of the base sinusoidal wave transmission. Each ON state of the base sinusoidal wave transmitted may then be sent as a forward biased low frequency sine wave with enough current to drive the circuit for the duration of the ON symbol. Further, the signal may be sent into a coupler to be connected to the twisted pair wire infrastructure. The transmitted signal may then be received at the far end and decoupled using a filter device. In one embodiment, the signal is received having a resistive load and input into an optocoupler device to convert and isolate the circuit. The receiver is current sensing and converts current to voltage. Once the current has been converted to voltage, the voltage may be sent to a differential Op Amp circuit to amplify the signal. In one embodiment, a low voltage differential signal receiver converts the wave form into a square wave that the receiving communication device can convert into a binary 1 (one) or binary 0 (zero) logic state. The transmission may be detected as a differential current event using the transmission initial conditions. By using a differential signal method and the T.E.M. waveform, the effect of standard noise conditions found in the twisted pair on the transmission is reduced. By providing a differential base voltage, the noise floor on the transmission is raised and the transmission has an improvement on the SNR (signal-to-noise ratio). In one embodiment, the low frequencies sinusoidal wave used in the transmitter may be generated by voltage-controlled oscillators.

BRIEF DESCRIPTION OF THE DRAWINGS

The following description of the attached drawing will provide the needed information to show the advantages and objects of the invention.

DETAILED DESCRIPTION OF THE INVENTION

Figure 1:
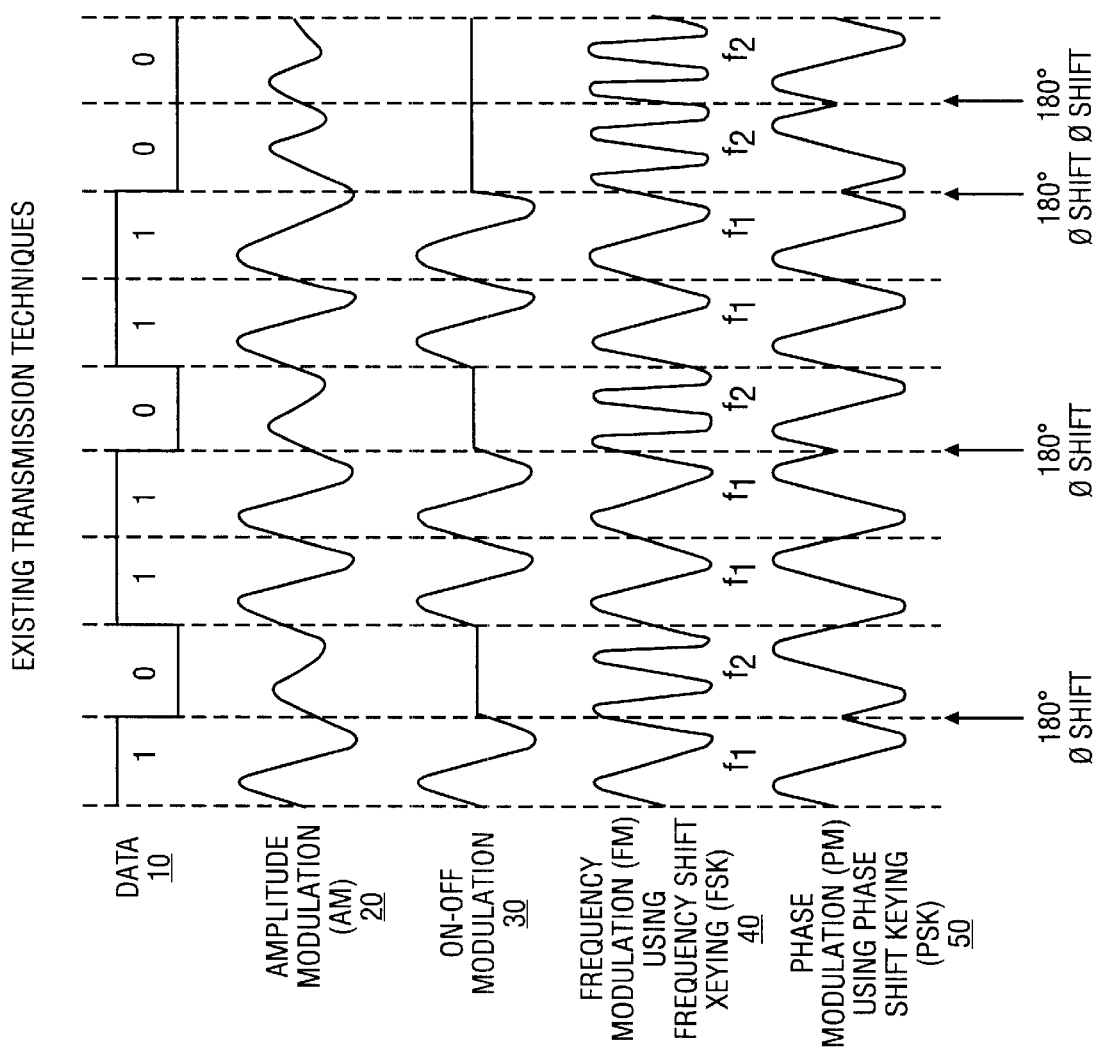
FIG. 1 is a diagram of conventional modulation techniques used in today's transmission technology.

In the following description, for purposes of explanation, numerous specific details are set forth in order to provide a thorough understanding of the present invention. It will be apparent, however, to one skilled in the art that the present invention can be practiced without these specific details. In other instances, wellknown structures and devices are shown in block diagram form in order to avoid obscuring the present invention.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

A method and apparatus for transmitting digital data over a twisted pair copper wire are described. According to one embodiment of the present invention, the digital data is transmitted over the twisted pair copper wire using a differential voltage, frequency offset, OOK transmission system that may include transceivers, twisted pair couplers, buffers, clocks, serial controllers, filters, oscillators, various interfaces and analog-to-digital (ADC) and digital-to-analog (DAC) converters.

Figure 2:
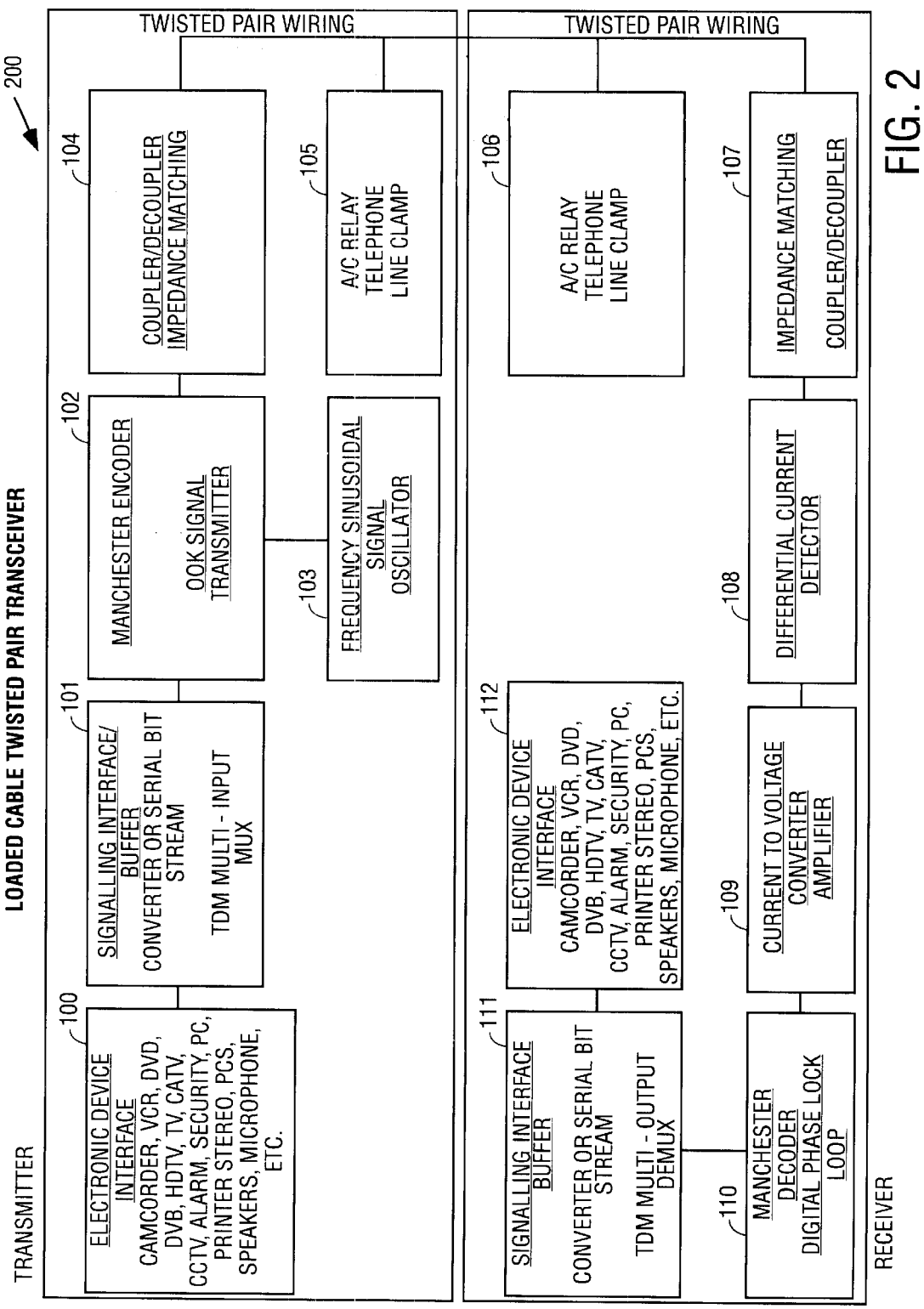
FIG. 2 is a diagram of the architecture of a transceiver, according to one embodiment of the present invention.

Referring to FIG. 2, the architecture of transmitter/receiver (transceiver) of one embodiment of the present invention is illustrated. Various data source devices may use electronic device interface 100 to connect to base technology transceiver 200 of the differential voltage, frequency offset (sinusoidal wave), OOK transmission technology. Examples of data source devices may include a digital video device, a printer, scanner or storage device, a Universal Serial Bus (USB) device, a cable TV, satellite or closed circuit TV device, a digital video broadcast device, an audio, stereo or speaker device, an infraded device, a Cebus 600 device, a telephone device, a camera or TV device, a radio or microwave device, and an Intercom device. Other examples of data source devices may include, but are not limited to, a transistor-transistor logic (TTL) device, an emitter coupled logic (ECL) device, a low voltage differential signaling (LVDS) device, a pseudo-emitter coupled logic (PECL) device, an HCMOS or CMOS device, an alarm or security device, a fiber optic interface device, a personal communications service (PCS) device, a personal computer device, a system-on-a-chip device, etc.

In one embodiment, device interface 100 outputs digital information (bits) into the input side of serial interface converter 101. Serial interface converter 101 may be necessary when parallel transmission methods are involved or when voltages need to be converted for interfacing. Serial interface converter 101 may be a device like the Zilog Z16C30 that converts parallel data to serial and buffers the transmission. The output side of serial interface converter 101 provides TTL voltage levels and is connected to the control input lead of transceiver 102. It should be noted that other levels, such as HCMOS (high-speed complementary metal oxide semi-conductor), ECL (emitter-coupled logic), LVDS (low voltage differential signal) or PECL (pseudo emitter coupled logic), may be provided by serial interface converter 101 without loss of generality.

Transceiver 102 uses a modulator that provides control of the OOK signal through the TTL voltage level control lead. In one embodiment, the modulator may be a Maxim DG211 (normally closed quad analog switch). The modulator's input is connected to a sinusoidal signal source (e.g., between 400 and 3300 hertz) oscillator 103. In one embodiment, oscillator 103 is a Conner-Winfield DSP1. The input of oscillator 103 may feed into an operational amplifier, such as, for example, a Burr-Brown OPA650, that drives the transmission line. In one embodiment, transceiver 102 uses a modulator to turn the sinusoidal signal On and back Off to the level of the differential ground (floating ground). It may be necessary to tie the output signal to the differential ground together with a capacitor and resistor to get the desired transmission settling. According to experimental studies, the use of the OPA650 as a wideband, low power voltage feedback operational amplifier allows to drive the transmission up to 85 mA, with other compatible chips providing higher current drive levels when necessary.

Transceiver 102 is further connected to twisted pair coupler 104. Twisted pair coupler 104 is used to connect the data circuit to the twisted pair wiring. In one embodiment, using relay 105, the standard circuit configuration can be maintained when local power is on. If for some reason local power is lost, the relay clamps are closed, and any existing telephone call may be transferred to the standard POTS analog connection for emergency services. In one embodiment, this is accomplished by using relay 105 that is normally open when AC is applied to relay 105. Relay 104 is connected to the twisted pair only when the power is turned off.

Referring again to FIG. 2, the architecture of a receiving part of transceiver 200 is illustrated, according to one embodiment of the present invention. In this embodiment, decoupler 107 on the receiver side is shown that connects to the twisted pair wiring. Decoupler 107 isolates the receiver from the twisted pair voltages and wiring. AC relay 106 is open when AC is applied to it and is closed when the power is turned off. Decoupler 107 provides impedance matching connected to the input side of differential current detector 108. Differential current detector 108 may use a differential photodiode transimpedance amplifier to detect the transmitted signal. In one embodiment, an operational amplifier such as a Burr-Brown OPA602 is used to the detect the transmitted signal.

The output side of differential current detector 108 is connected to current to voltage converter and amplifier 109. Using a photodiode amplifier connecting to a virtual floating ground current-to-voltage converter, such as, for example, Burr-Brown OPA128, allows to provide the output voltage source needed at demodulator 110. The output side of current to voltage converter and amplifier 109 (e.g., OPA128) is connected to the input of demodulator 110 (e.g., Burr-Brown RCV420) that provides a 0–5 voltage TTL compatible signal that is input into serial interface buffer 111. The output side of serial interface buffer 111 is then connected to a computer or digital data interface input device 112. Data buffering is provided for flow control.

Transceiver 200 shown in FIG. 2 is configured to control clocking/timing, channelization and broadcasting of transmission over the twisted pair copper wire. In one embodiment, OOK signal transceiver 102 on the transmitter side uses a Manchester codec to transmit data, and demodulator 110 on the receiver side uses a DPLL (digital phase lock loop) to recover clocking/timing. In one embodiment, channelization is provided using TDM (Time Division Multiplexing) at signaling is interface 101 on the transmitter side and at signaling interface 111 at the receiver side. In one embodiment, from 2 to 256 channels are provided. Transmission of information may be accomplished using channels of asynchronous, isochronous and synchronous transmissions. Using asynchronous transmission, high-speed data may be interchanged between devices. Isochronous transmission may be used for video broadcasting and telephone transmissions. Synchronous transmission may be used when clock cycles are needed between the transmitting and receiving devices. In one embodiment, the information is framed into various formats, such as, for example, SDLC (synchronous data link control), HDLC (high-level data link control), Frame Relay, X.25, ATM (asynchronous transfer mode) and others, for error checking, timing, headers, and addressing.

Figure 3:
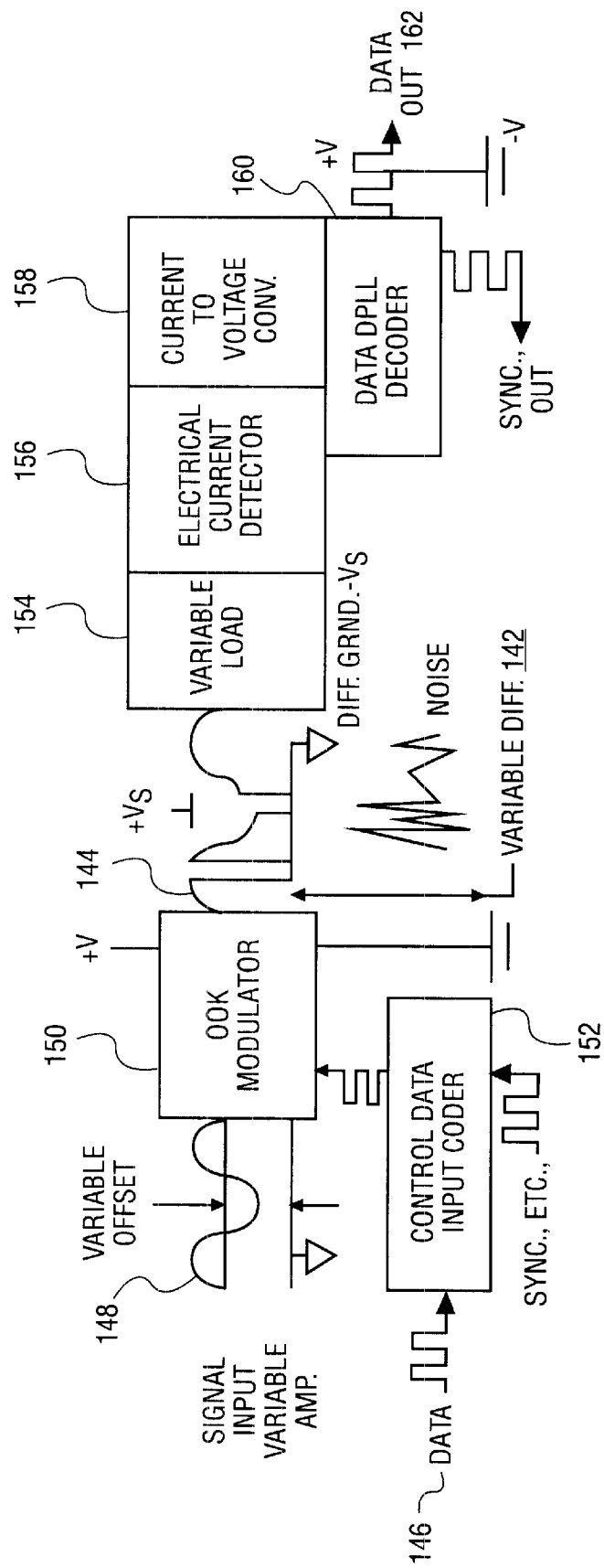
FIG. 3 is a diagram of a variable low frequency offset, differential voltage, OOK, high-speed twisted pair communications transmission technique, according to one embodiment of the present invention.

FIG. 3 is a diagram of a variable low frequency offset, differential voltage, OOK, high-speed twisted pair communications transmission technique, according to one embodiment of the present invention.

Referring to FIG. 3, signal input 148 is generated by sinusoidal wave oscillator (e.g., oscillator 103 of FIG. 2) that has a variable offset differential reference ground that enters OOK Modulator 150 (e.g., a modulator included in OOK signal receiver of FIG. 2). In one embodiment, modulator 150 is controlled by the input of data stream 146 along with encoded timing, control and synchronization information provided by control data input encoder 152. The output generated by modulator 150 is totally above (referenced as positive +) or below (referenced as negative −) the system/earth ground reference. This provides the differential ground reference that may be varied by adjusting the differential voltage level above the noise floor of the transmission lines involved.

The amplitude of the signal coming out of modulator 150 is associated with a voltage signal Vs as shown in FIG. 3. The output signal of modulator 150 goes through variable load 154 which provides the current level sufficient for detection of current by the transmission system. In one embodiment, this current level can be adjusted from 2 mA to 500 mA as required for signal detection. The current detection is performed by electrical current detector 156. Electrical current detector 156 detects current with differential characteristics and passes this differential current to current to voltage converter 158. Electrical current detector 156 also provides for isolating a transmitter from a receiver, such as the transmitter and receiver of FIG. 2. Current to voltage converter 158 converts differential current into voltage and allows for isolation of the receiver. Current to voltage converter 158 allows the receiver to transmit the data out at standard voltage reference levels (e.g., 0v–5v).

Decoder 160 incorporates DPLL tracks and removes timing, control and synchronous information bits out of the data stream to recreate the original data transmission. The timing, control and synchronous bits are used to coordinate the transmitter and receiver ends of the link. Afterwards, output 162 of the receiver is sent to digital device interface (e.g., device interface 112).

The method and system for transmitting data over twisted pair copper wires using a low frequency offset, differential voltage, OOK transmission technique have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method for transmitting data over a twisted pair network using a differential voltage, frequency offset, OOK transmission, the method comprising:

receiving a data signal from a data source device;

providing a base frequency carrier;

controlling states of the base frequency carrier, the carrier states including an on state and an off state;

transmitting the data signal, using the base frequency carrier, to a twisted pair wire via a twisted pair coupler;

receiving the transmitted data signal from the twisted pair wire by a twisted pair decoupler; and sending the data signal to a data receiving device.

2. The method of claim 1 further comprising transferring the data signal to a POTS analog connection for emergency services when power in the twisted pair network is turned off.

3. The method of claim 1 further comprising transmitting control and timing information within a serial bit stream.

4. The method of claim 1 wherein the data signal is transmitted from the data source device to the data receiving device over the twisted pair network at a rate equal to an output rate of the data source device plus a transmission control overhead.

5. The method of claim 1 wherein a frequency of the base frequency carrier is set according to a minimum signal to noise ratio.

6. The method of claim 1 wherein the data signal is transmitted using the base frequency carrier as a forward biased low frequency wave.

7. A transmission system for transmitting data from a data source device to a data receiving device over a twisted pair network using a differential voltage, frequency offset, OOK transmission, the system comprising:

a transmitter to receive a data signal from the data source device, to provide a base frequency carrier, to control states of the base frequency carrier, the carrier states including an on state and an off state, and to transmit the data signal, using the base frequency carrier, to a twisted pair wire via a twisted pair coupler; and a receiver, coupled to the transmitter, to receive the transmitted data signal from the twisted pair wire by a twisted pair decoupler and to send the data signal to a data receiving device.

8. The system of claim 7 wherein the transmitter is configured to transfer the data signal to a POTS analog connection for emergency services using an AC relay when power in the twisted pair network is turned off.

9. The system of claim 7 wherein the transmitter is configured to transmit control and timing information within a serial bit stream.

10. The system of claim 7 wherein the transmitter is configured to transmit the data signal to the data receiving device over the twisted pair network at a rate equal to an output rate of the data source device plus a transmission control overhead.

11. The system of claim 7 wherein a frequency of the base frequency carrier is set according to a minimum signal to noise ratio.

12. The system of claim 7 wherein the data signal is transmitted using the base frequency carrier as a forward biased low frequency wave.

* * * * *